United States Patent [19]

Fujisawa

[11] 4,294,154
[45] Oct. 13, 1981

[54] MUSIC TONE GENERATING SYSTEM
[75] Inventor: Hidetaka Fujisawa, Fussa, Japan
[73] Assignee: Casio Computer Co., Ltd., Tokyo, Japan
[21] Appl. No.: 104,911
[22] Filed: Dec. 18, 1979
[30] Foreign Application Priority Data Dec. 27, 1978 [JP] Japan ................. 53-161881

[51] Int. Cl.³ ............... G10H 1/00; G10H 5/00
[52] U.S. Cl. ....................... 84/1.01; 84/478
[58] Field of Search .......... 84/1.01, 1.03, 464 R, 84/464 A, 478, 479 R, 479 A

[56] References Cited

U.S. PATENT DOCUMENTS

| | | | |
|---|---|---|---|
| 3,771,406 | 11/1973 | Wheelwright | 84/464 |
| 3,837,256 | 9/1974 | Gullickson | 84/478 |
| 3,881,390 | 5/1975 | Gullickson | 84/478 |
| 4,012,979 | 3/1977 | Wemekamp | 84/1.01 |
| 4,031,797 | 6/1977 | Schmoyer | 84/478 X |
| 4,054,868 | 10/1977 | Rose | 84/478 X |

*Primary Examiner*—S. J. Witkowski
*Attorney, Agent, or Firm*—Frishauf, Holtz, Goodman and Woodward

[57] ABSTRACT

In a music tone generating system, of entry data keyed in by a plurality of entry keys related to the music tones, the entry data falling within the maximum digits which can be displayed by a display device are displayed by setting up one mode selected. When an entry key is operated to enter entry data exceeding the maximum digits while the former entry data remains displayed, the music tone corresponding to the key depressed may also be generated.

7 Claims, 17 Drawing Figures

MUSIC TONE GENERATING SYSTEM

BACKGROUND OF THE INVENTION

The invention relates to a music tone generating system which can generate a music tone related to a key which is depressed to key in entry data exceeding the maximum digits a display device can display while the display device is displaying the entry data previously keyed in within the maximum digits.

In some of the recent electronic calculators, part or all of the key switches are related to music tones such as C, D, E . . . and when a key switch is depressed, the music tone related to the depressed key switch is generated. Accordingly, an operator may identify the key depressed auditorily. Further, if keys are operated in succession properly, a simple song can be played.

In operating this type of electronic calculator which can execute a calculation, generate a music tone and play a song by operating the same key or keys, an operator selects a mode from a plurality modes. A calm mode associated with an operation mode is selected when the operator desires to generate no sound at the time of the key operation. Inversely, when the operator desires to generate sounds in such a case, a sounding mode is selected. In operating keys, if the operator desires to play a music piece, a music playing mode is selected. In the second mode, or the sounding mode, for example, when the entry keys within the number of digits proper to the display section of the electronic device are depressed, the entry data keyed in by the depressed keys are displayed by the display section while at the same time the music tones are generated for each digit or key. However, when a key is depressed keying in entry data corresponding to the digit exceeding to the display digits of the display section, no display of the entry data is performed and no music tone related to the depressed key is generated.

In the third mode or the music playing mode, no entry data is displayed in the display section; however, in this mode, the generation of the music tones corresponding to the display digits of the display section and the music tones corresponding to the entry data of the digits exceeding the display digits may be generated by operating the related keys, regardless of the number of display digits in the display section, and further a music piece may also be played similarly.

The selection of one of those three modes is made by means of a slide switch, generally. The structure of the slide switch is complicated when it is used as a part of the electronic switch. A push button is sometimes used for the mode selection switch, instead of a slide switch. In this case, the number of keys used for the electronic device increases or a double function key with a multi-function must additionally be used. Further, an amount of program to be microprogrammed into the ROM (read only memory) increases with more complicated design of an electronic circuit including an ROM.

Accordingly, an object of the invention is to provide a music tone generating system in which the entry data are displayed by operating the entry keys corresponding to the display digits of the display section while at the same time the music tones corresponding to the display digits are generated, and when an entry key corresponding to a digit exceeding the display digits of the display section is operated, the music tone corresponding to the digit exceeding the display digits is generated while the display of the entry data in the display section is maintained.

SUMMARY OF THE INVENTION

To achieve above object, the present invention is comprises of entry keys related to a plurality of music tones, means for executing the process of the entry data corresponding to the operation of the entry key and for displaying the result of the process; and music tone generating means for generating the music tone when the key related to the music tone is operated and for stopping the generation of the music tone when the operation of the entry key operation terminates.

With such a construction, the entry data falling within the display digits of the display section are displayed by operating the entry keys related. As the same time, the music tone corresponding to the respective display digits are generated. When an entry key corresponding to a digit exceeding the display digits of the display section is operated, the music tone related to the entry key may be generated while the display of the entry data is kept. Therefore, without increasing the number of modes, i.e. with a single mode, the key operation at the time of the calculation may be confirmed by hearing the music tone related, and an overflow at the data entry time may also be confirmed similarly. Further, a music piece may also be played by operating the entry keys in succession.

BRIEF DESCRIPTION OF THE DRAWINGS

FIGS. 4A(A) to 4B(N) show the contents of a register display section and a sound generating element when the music piece shown in FIG. 2 is played.

DETAILED DESCRIPTION

Figure 1:
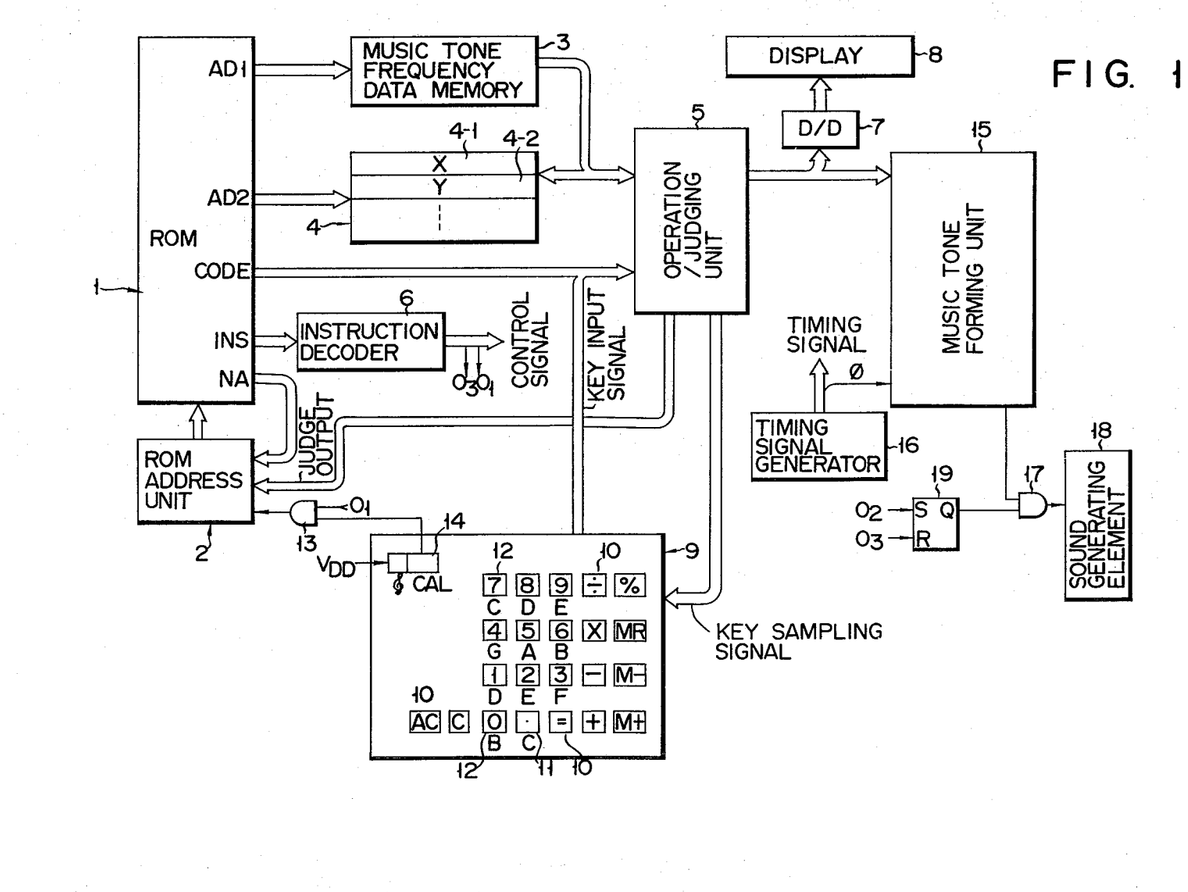
FIG. 1 shows a block diagram of an electronic calculator as an embodiment of the invention.

In FIG. 1 illustrating a circuit construction of an embodiment of the music tone generating system of the invention, a read only memory (ROM) 1 is addressed by the output of an ROM address unit 2. The ROM 1 produces an address designating signal AD1, another address designating signal AD2, a code signal CODE, a instruction signal INS, a next address designating signal NA, and the like. The address designating signal AD1 is used to designate addresses in a music tone frequency data memory 3 for storing the frequency data of individual music tones. The address designating signal AD2 is used to designate registers and digits in a random access memory (RAM) 4 having an X register 4-1 serving also as a display register and a Y register 4-2, and the like. The code signal CODE supplies given code data to an operation/judging unit 5 when a code operation or a code judgement is performed. The instruction signal INS controls an instruction decoder 6 to produce control signals 01 to 03 to be described later and various control signals to control the operations of the respective circuits. The next address designating signal NA directs the ROM address unit 2 to designate the next address.

In the operation/judging unit 5, various operations are performed in accordance with the data supplied from the RAM 4 or the code signal CODE supplied from the ROM 1. The result of the operation is transmitted through a display driver D/D 7 to a display 8 capable of displaying 10 digits, for example. In a judging mode of the operation/judging unit 5, the result of the judgement is supplied to the ROM address unit 2 to designate an address in the ROM 1, together with the next address signal NA. A key sampling signal is supplied to a key input section 9 to detect an operated key.

As shown, the key input section 9 has an arrangement of function keys 10 such as arithmetic operation keys, an equal key, a clear key, and the like, a decimal point key 11, and ten keys 12 assigned to digits "0" to "9". A keyed-in signal is transferred to the operation/judging unit 5 where an keyed-in process is performed. The key input section 9 is further provided with a mode switch 14 such as a slide switch. The mode switch 14 selects a sounding mode denoted as a G clef or a calm mode denoted as "CAL." With the mode switch 14 actuated, a voltage $V_{DD}$ (logical "1") being constantly applied to the switch is supplied to the ROM address unit 2 through an AND gate 13 enabled by the control signal $0_1$ only when the sounding mode is set up.

The names of the music tones sounded when the corresponding key switches are actuated by depression are marked by printing, for example, near the related ten keys 12 and the decimal point key 11. The relation between the those keys and the related musical tones is tabulated in the table below.

TABLE

| Key Switches | Musical Tones |
| --- | --- |
| Ten key (0) | (B3) |
| Decimal point key | (C4) |
| Ten key (1) | (D4) |
| Ten key (2) | (E4) |
| (3) | (F4) |
| (4) | (G4) |
| (5) | (A4) |
| (6) | (B4) |
| (7) | (C5) |
| (8) | (D5) |
| (9) | (E5) |

The operation/judging unit 5 supplies the music frequency data to a music tone forming unit 15. Upon receipt of the data signal, the music tone forming unit 15 properly frequency-divides a basic or fundamental clock $\phi 1$ derived from a timing signal generator 16 for generating various timing signals to produce a music tone. The music tone signal is applied to an AND gate 17, together with a clock pulse with the same frequency as that of the music tone signal shown in Table, so that the AND gate 17 is enabled to permit the clock signal to pass therethrough to reach the sound generating element 18. Finally, the sound generating element sounds the music tone applied from the key depressed. To one input terminal of the AND gate 17, the set output Q from a flip-flop 19 is applied to make a control as to if the clock pulse is applied to the sound generating element 18. As shown, the control signal $0_2$ is applied to the set terminal S of the flip-flop 19 and the control signal $0_3$ is applied to the reset terminal R.

The operation of the electronic calculator mentioned above will be described below.

Figure 2:
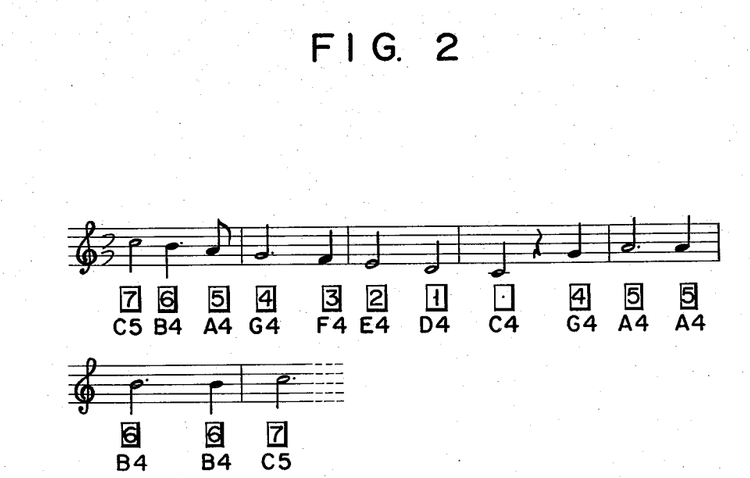
FIG. 2 shows a part of a music piece and the corresponding key operations.
Figure 3:
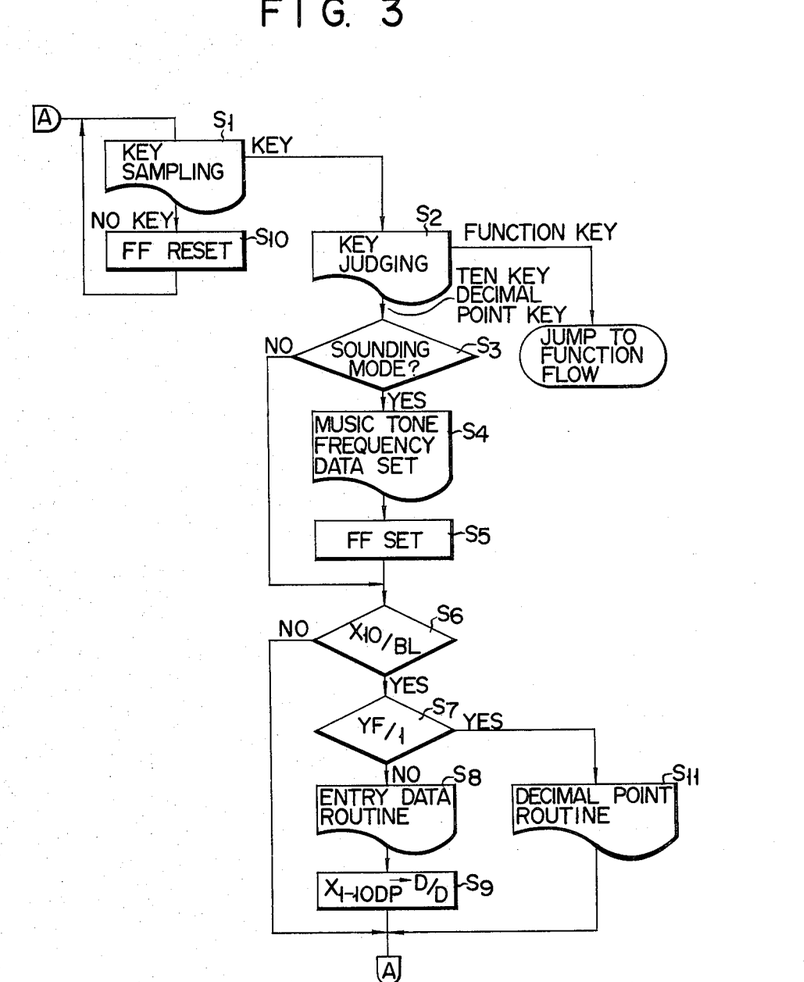
FIG. 3 shows a flow chart for illustrating the operation of the embodiment shown in FIG. 1.

Firstly, the mode switch 14 set is to the sounding mode and the keys are operated in the order as shown in FIG. 2. This operation will be described in detail. The key switch "7" as one of the ten keys 12 is operated. With the key switch depressed, a process $S_1$ shown in FIG. 3 is executed where the presence of the depressed key is detected by a key sampling signal derived from the operation/judging unit 5, and then the next process $S_2$ is executed.

In the process $S_2$, the kind of the depressed key is judged on the basis of the key input signal incoming from the key input section 9. If the depressed key is the function key 10, the program jumps to each function flow and returns to the process $S_1$ after the flow execution is completed. In this case, since the ten key 12 is operated, the program flows to a step $S_3$. When the decimal point key 11 is operated, "1" is loaded into the flag digit (F) of the Y register 4-2 and then the program advances to the step $S_3$.

In the step $S_3$, the control signal $0_1$ is applied to the AND gate 13, so that the output of the mode switch 14 is supplied to the ROM address unit 2, thereby to designate the address of the next step of the program, together with the next address signal NA. When the calculator is set to the calm mode, the output signal of the AND gate 13 is logical "0" and the program proceeds to the next step $S_6$ to be described later. In this case, however, the output of the AND gate 13 is logical "1," o that the program advances to a process $S_4$.

The process $S_4$ reads out the music tone frequency data corresponding to the key switch depressively operated from the music tone frequency data memory 3, and sets the read out one in the music tone forming unit 15, through the operation/judging unit 5. In this case, the frequency data of the music tone $C_5$ corresponding to the key switch "7" is set in the music tone forming unit 15 and the application of the clock pulse corresponding to the music tone $C_5$ to the AND gate 17 starts.

The program next advances to a step $S_5$. In this step $S_5$, the instruction decoder 6 produces the control signal $0_2$ to set the flip-flop 19 and to enable the AND gate 17. Then, the clock pulse produced from the music tone forming unit 15 is applied to the sound generating element 18 thereby to start the sounding of the music tone $C_5$.

Then, a step $S_6$ is executed. This step $S_6$ causes the operation/judging unit 5 to judge if a blank key code (BL) is stored in the 10th digit (the most significant digit) of the display register, or the X register 4-1. When the result of the judgement is NO, the program proceeds to the process $S_1$. In this case, however, it is YES and then the program advances to a step $S_7$.

Figure 4A:
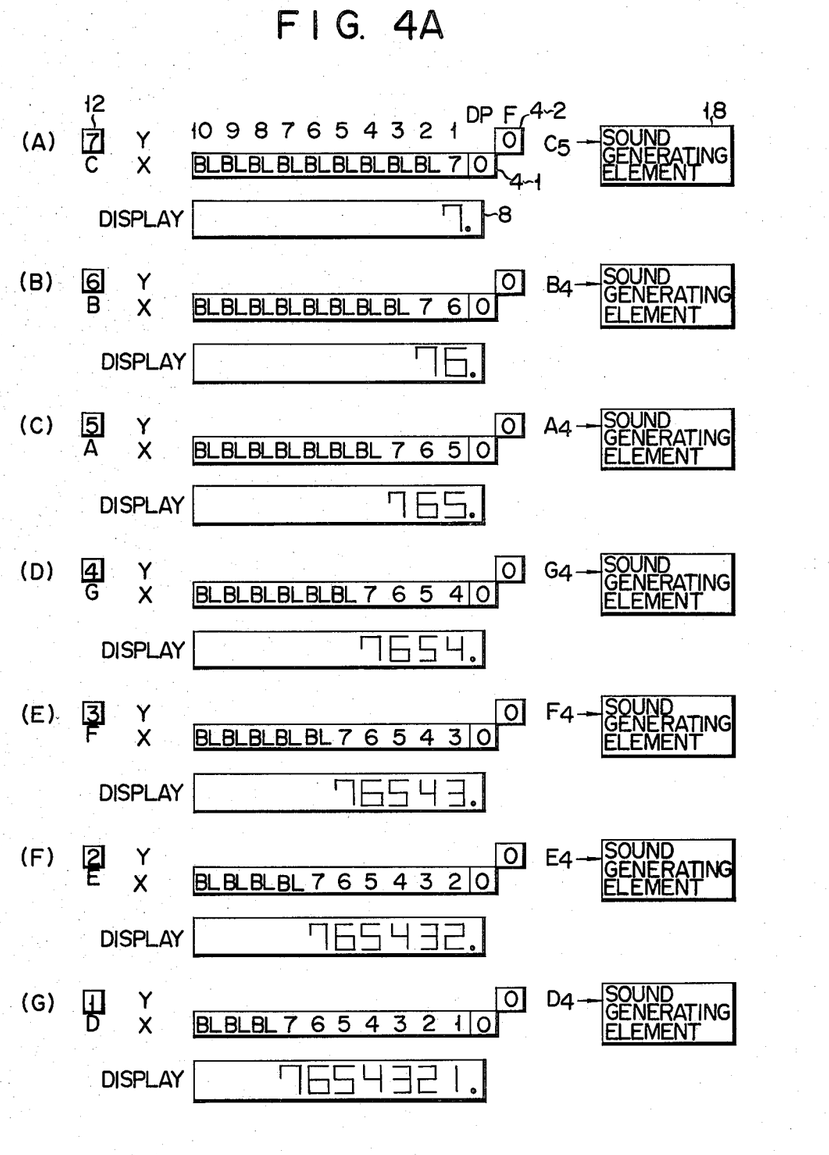
Figure 4B:
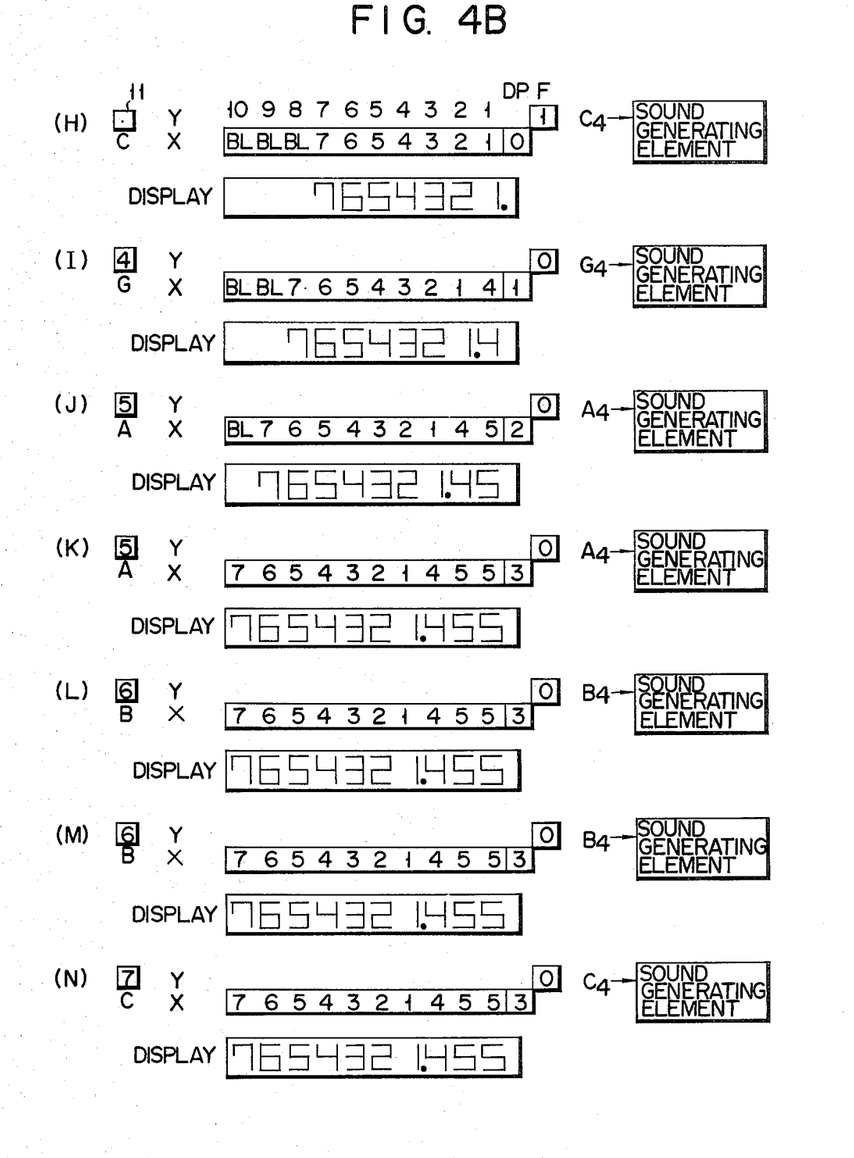

The step $S_7$ judges whether if "1" is stored in the flag digit of the Y register 4-2 or not. In this case, however, the flag digit is "0," so that the program advances to a process $S_8$, or an entry data routine. The process $S_8$ judges if it is the first entry or not, if the decimal point key 11 was previously operated or not, and the like, and then executes the process of the given entry data. As a result of the process, "7" is loaded into the first digit of the X register 4-1, as shown in FIG. 4A(A), in this case. The "7" loaded is transferred to a display driver 7 and then displayed by the display 8, in a step $S_9$. The position of the decimal point is displayed in accordance with the contents of the decimal designating digit (DP) of the X register 4-1. To be more specific, when the contents of the decimal point designating digit (DP), the decimal point position is displayed at the first digit of the display 8. When it is "1" the decimal point position is displayed at the second digit. When it is "9," the position is displayed at the 10 digit.

After the execution of the step $S_9$ is completed, the program returns to the process $S_1$. In the process $S_1$, the key sampling operation continues until the key operation is completed, thereby to cause the sound generating element 18 to continue the sounding of the music tone (C$_5$ in this case). Accordingly, it is evident that the music sound with the time length such as a half note, a quarter note, an eighth note, or dotted notes may be sounded by changing the depression lasting time of each key switch. In this case, the key is released after the key switch "7" is depressed for the time of the half note. If so done, no key depressed is detected by the operation/judging unit 5 and the program advances to a step S$_{10}$.

In the step S$_{10}$, the instruction decoder 6 produces the control signal 0$_3$ to reset the flip-flop 19 thereby to stop the sounding of the music sound C$_5$.

The program returns to the process S$_1$ again and prepares for the next key inputting. Then, when the key switch "6," for example, is operated, as shown in FIG. 4A(B), the process S$_2$ through the step S$_9$ are executed, as in the above case, and the data "7" already keyed in is carried while at this time the data "6" newly keyed in is loaded into the first digit of the X register 4-1 and then is displayed by the display 8. At this time, the sound generating element 18 produces the music tone B$_4$, as shown in FIG. 2. Incidentally, the key switch "6" is depressed for the time length of the dotted quarter note, in this time.

Subsequently, the key switches "5," "4," "3," "2" and "1" are successively depressed for the time lengths of the eighth note, the dotted half note, the quarter note, and the half note. Accordingly, the carry processings are performed in succession, as shown in FIGS. 4A(C) to 4A(G). Correspondingly, the data related to the key operations are inputted and displayed and the music tones A$_4$, G$_4$, F$_4$, E$_4$ and D$_4$ are generated from the sound generating element 18, with the corresponding length of the tones.

Further, when the decimal point key 11 is depressed for the length of the half tone, "1" is stored in the flag digit of the Y register 4-2 in the process S$_2$, as shown in FIG. 4B(H), so that the judgement "YES" is produced in the step S$_7$. Following the execution of the step S$_7$, a process S$_{11}$ is executed.

The process S$_{11}$ is a decimal point routine. This process S$_{11}$ sets, for example, a flag to store the operation of the decimal point key 11, and to increment by one the contents of the decimal point designation digit of the X register 4-1, through the operation of the ten key 12.

After the completion of the process S$_{11}$, the program returns to the process S$_1$ again. At an instant that the depression of the decimal point key 11 is released, the program goes to the step S$_{10}$ which stops the sounding of the music tone C$_4$.

Similarly, after the operation ceases for the quarter note time, the key switches "4," "5" and "5" are depressed for the times of the quarter note, the dotted half tone and the quarter tone, as shown in FIG. 2 and FIGS. 4B(I), (J) and (K), . . . . As a result, the music tones G$_4$, A$_4$ and A$_4$ are sounded. In the process S$_8$ when the respective keys are being operated, the contents of the decimal point digit in the X register 4-1 is incremented, so that the decimal point is displayed at the positions to which the carry is made successively.

As shown in FIGS. 2 and 4B(L), if the key switch "6" is operated after the respective data are stored in all the digit positions (the first to tenth digit positions) of the X register 4-1, a music tone B$_4$ begins to be produced. Then, the result of judgment of the steps S$_6$ is NO, permitting a return to the process S$_1$ without executing the process S$_8$ and step S$_9$. Thus, the display state of the display device 8 remains as shown in FIG. 4B(K) and only the music tone B$_4$ corresponding to the key switch 6 is produced. As shown in FIGS. 2 and 4B(M), (N), if the key switches "6" and "7" are likewise operated, the display state of the display device 8 remains unchanged as shown in FIG. 4B(K) and the music tones B$_4$, C$_4$ are produced. In this case, however, no input processing is likewise performed at the time when the decimal point key 11 is operated and the corresponding music tone C$_4$ is produced.

Accordingly, if the decimal point key 11 and the ten key 12 are operated exceeding the display digits of the display device 8 in the sounding mode, the data already inputted is held and displayed while at the same time the music tone related to the key switch operated is successively sounded. Therefore, the sound to confirm the key operation at the time of the calculation and the playing of the musical piece may be performed in the same sounding mode and the circuit control may easily be performed.

As described above, in the above embodiment, the frequency data of a plurality of music tones are fixedly stored in the music sound frequency data memory unit 3 and the clock $\phi$1 is properly frequency-divided by the music sound forming unit 15 in accordance with the frequency data to thereby produce the music sounds corresponding to the key operations. However, this may be variously modified. As a modification, for example, the music tone frequency data are microprogrammed and stored in the ROM 1, the music tone frequency data is read out therefrom as a code signal CODE and the code signal CODE read out is supplied to the music tone forming unit 15 through the operation/judging unit 5. In this way, the music tone corresponding to the depressed key may be sounded. As another modification of the invention, a counter is formed by using the RAM 4 and the operation/judging unit 5 and the like under control of the ROM 1, to form a two level signal with a period corresponding to the music tone selected. The two level signal is applied for the time a key is depressed to the sound generating element 18 to thereby generate the music tone corresponding to the depressed key. While the music tone generating system of the invention has been described in connection with an electronic calculator, it may also be applied to an electronic timepiece with ten keys for time setting. In this case, when key-in operations are made in succession after a given time is set, the time data set is protectively displayed while the music tone corresponding to the key switch depressed is generated. Many other modifications and applications of the invention are permitted within the scope of the invention.

What is claimed is:

1. A music tone generating system comprising:
    key input means including entry keys and function keys for inputting data, said keys having at least a corresponding relation to a plurality of music tones;
    display data memory means for storing data to be displayed;
    key input data processing means connected between said key input means and said display data memory means for executing a key input processing operation in accordance with a key operation by said key input means and for delivering data to be displayed as an output to the display data memory means;
    display means coupled to said display data memory means and having a plurality of display digits for displaying the data to be displayed which is stored in said display data memory means;

a sound producing element for producing a sound corresponding to a music tone;

music tone signal producing means for delivering a frequency signal corresponding to each of a plurality of music tones to said sound producing element in accordance with the operation of the keys of said key input means which have a corresponding relation to music tones;

detecting means for detecting that at said display means the display data is displayed over all the display digit positions thereof; and control means coupled to said detecting means for suppressing an output corresponding to the display data at said key input data processing means according to the result of detection of said detecting means when the keys having the corresponding relation to the music tones are operated and for causing said music tone producing means to deliver said frequency signal as an output to said sound producing element.

2. The music tone generating system of claim 1, wherein said entry keys permit the entry of data corresponding to one of said display digits of said display means.

3. The music tone generating system of claim 1, wherein said entry keys permit the entry of numerical data; said function keys designate a calculation; and said key input data processing means causes display data calculated according to the calculation designated by said function keys to be delivered as an output to said display data memory means.

4. The music tone generating system of claim 1, wherein said key input data processing means comprises an electronic calculator means, and wherein said entry keys are for the entry of numerical data and said function keys include keys for instructing said key input data processing means to perform a mathematical data processing operation.

5. A music tone generating system comprising:
key input means including entry keys and function keys for inputting data, said keys having a corresponding relation to a plurality of music tones;
display data memory means for storing data to be displayed;
key input data processing means connected between said key input means and said display data memory means for executing a key input processing operation in accordance with a key operation of said key input means and for delivering the data to be displayed as an output to said display data memory means;
display means coupled to said display data memory means and having a plurality of display digits for displaying said data to be displayed which is stored in said display data memory means;
a sound producing element for producing a sound corresponding to a music tone;
music tone signal producing means for delivering a frequency signal corresponding to each of a plurality of music tones to said sound producing element in accordance with the operation of the keys of said key input means which have a corresponding relation to said music tones;
detecting means for detecting that at said display means the display data is displayed over all the display digit positions thereof;
control means coupled to said detecting means for suppressing the output of a display digit at said key input data processing means according to the result of detection of said detecting means when the keys having the corresponding relation to the music tones are operated and for causing said music tone producing means to deliver said frequency signal as an output to said sound producing element;
mode selection means for selecting two modes, namely, a sounding mode and calm mode; and
sound control means coupled to said mode selection means and to said music tone producing means for selectively inputting the frequency signal to the sound producing element when said sounding mode is selected by said mode selection means and suppressing the inputting of the frequency signal to the sound producing element when the calm mode is selected by the mode selection means.

6. The music tone generating system of claim 5, wherein said entry keys permit the entry of data corresponding to one of said display digits of said display means.

7. The music tone generating system of claim 5, wherein said entry keys permit the entry of numerical data; said function keys designate a calculation; and said key input data processing means includes calculation means and includes means for delivering as an output to the display data memory means the display data which is subjected by said calculation means to calculation according to the operation of said function keys.

* * * * *

UNITED STATES PATENT AND TRADEMARK OFFICE
CERTIFICATE OF CORRECTION

PATENT NO. : 4,294,154
DATED : October 13, 1981
INVENTOR(S) : Hidetaka FUJISAWA

It is certified that error appears in the above—identified patent and that said Letters Patent is hereby corrected as shown below:

COLUMN 3, line 62, after "switch 14" change "set is to" to

--is set to--.

Signed and Sealed this

Twenty-third Day of February 1982

[SEAL]

Attest:

GERALD J. MOSSINGHOFF

Attesting Officer        Commissioner of Patents and Trademarks